United States Patent
Holemans et al.

(10) Patent No.: US 12,129,055 B2
(45) Date of Patent: Oct. 29, 2024

(54) SYSTEM AND METHOD FOR EFFICIENT DEPLOYMENT AND RETRIEVAL OF SPACE VEHICLES

(71) Applicant: Planetary Systems Corporation, Silver Spring, MD (US)

(72) Inventors: Walter Holemans, Washington, DC (US); Ryan Williams, San Diego, CA (US)

(73) Assignee: Planetary Systems Corp., Silver Spring, MD (US)

( * ) Notice: Subject to any disclaimer, the term of this patent is extended or adjusted under 35 U.S.C. 154(b) by 139 days.

(21) Appl. No.: 17/557,624

(22) Filed: Dec. 21, 2021

(65) Prior Publication Data
US 2022/0119135 A1 Apr. 21, 2022

Related U.S. Application Data

(63) Continuation-in-part of application No. 16/511,864, filed on Jul. 15, 2019, now Pat. No. 11,267,591.

(60) Provisional application No. 63/241,067, filed on Sep. 6, 2021, provisional application No. 62/698,380, filed on Jul. 16, 2018.

(51) Int. Cl.
*B64G 1/64* (2006.01)
*B64G 1/00* (2006.01)
*B64G 1/66* (2006.01)

(52) U.S. Cl.
CPC ............. *B64G 1/641* (2013.01); *B64G 1/002* (2013.01); *B64G 1/66* (2013.01); *B64G 1/643* (2023.08)

(58) Field of Classification Search
CPC .......... B64G 1/641; B64G 1/002; B64G 1/66; B64G 1/643; B64G 1/646; B64G 1/10; B64G 1/22; B64G 1/222; B64G 1/62; B64G 1/1078
See application file for complete search history.

(56) References Cited

U.S. PATENT DOCUMENTS

| | | | | |
|---|---|---|---|---|
| 5,129,601 A | * | 7/1992 | Henkel | B64G 1/222 124/1 |
| 5,522,569 A | * | 6/1996 | Steffy | B64G 1/222 244/172.6 |
| 8,550,408 B2 | * | 10/2013 | Ross | B64G 1/641 244/159.4 |

* cited by examiner

*Primary Examiner* — Valentina Xavier
(74) *Attorney, Agent, or Firm* — Robert M. McDermott

(57) ABSTRACT

A system and method for installing, deploying, and recovering a plurality of spacecraft that provides an ease of use and structural stability, and facilitates a standardization of spacecraft design. In embodiments of this invention, threaded rods are arranged orthogonal to a surface of a baseplate, and each spacecraft includes a coupling mechanism that selectively engages or disengages each threaded rod. Each spacecraft is added to the stack by engaging its coupling mechanism and rotating the threaded rods while the preceding spacecraft on the stack disengage their coupling mechanisms, thereby enabling the spacecraft to travel along the threaded rods toward the baseplate. When all the spacecraft are added to the stack, the stack is preloaded by rotating the treaded rods into a terminator component at the top of the stack while the coupling mechanisms in all of the spacecraft are disengaged. Spacecraft are deployed by reversing the process.

39 Claims, 7 Drawing Sheets

SYSTEM AND METHOD FOR EFFICIENT DEPLOYMENT AND RETRIEVAL OF SPACE VEHICLES

This application claims the benefit of U.S. Provisional Patent Application 63/241,067, filed 6 Sep. 2021, and is a Continuation-In-Part of U.S. patent application Ser. No. 16/511,864, filed 15 Jul. 2019, which is incorporated by reference herein, and which claims the benefit of U.S. Provisional Patent Application 62/698,380, filed 16 Jul. 2018.

BACKGROUND AND SUMMARY OF THE INVENTION

This invention relates to the field of space craft, and in particular to a system and method for attaching multiple space vehicles to a launch vehicle, deploying the space vehicles, and recovering other space vehicles.

To reduce the cost of space vehicle deployment, and in particular small spacecraft (e.g., under 500 pounds), the U.S. Department of Defense (DoD), NASA, other government agencies, commercial companies, and several universities developed the EELV (Evolved Expendable Launch Vehicle) Secondary Payload Adapter (ESPA), which enables multiple small spacecraft to be launched from ATLAS V, Falcon 9, and other launch vehicles. Other standards for multi-satellite payloads are also available, such as Loadpath's Cubestack, SSO-A's Multi Payload Carrier and Hub, and others, each with particular advantages and disadvantages. For ease of explanation and understanding, the EELV-ESPA standard is used herein to provide a contrast to embodiments of this invention.

FIGS. 1A-1C illustrate an example EELV Secondary Payload Adapter. The adapter 100 is cylindrical, and includes six ports 110, each with an attachment flange 120. Each spacecraft 150 has a mating attachment flange 130. Each spacecraft 150 is coupled to the adapter 100 by coupling the attachment flanges 120, 130. This coupling may be accomplished using a motorized LightBand 140 (U.S. Pat. Nos. 6,227,493; 6,343,770; 6,390,416) from Planetary Systems, Inc., which is tightened around the circumference of the joined flanges 120-130. Deployment after launch is accomplished by loosening the LightBand 140.

As illustrated in FIG. 1B, the individual spacecraft can be different in size and shape, provided they conform to an overall envelope and include the appropriate flange 130. As illustrated in FIG. 1C, the adapter 100 is designed to be situated concentric with the vertical axis 182 of the launch vehicle 180, and multiple adapters 100 can be stacked within the launch vehicle 180, again, for example, using a LightBand to couple the adapters 100.

Although the ESPA provides a standard architecture for designing the spacecraft interface to the launch vehicle and enables multiple spacecraft to be launched from a single launch vehicle, it is not particularly efficient in volume and weight.

As illustrated in FIGS. 1B and 1C, a significant amount of volume is wasted between the vehicles 150, and between the vehicles 150 and the fairing 185 of the launch vehicle. In a typical configuration, the volume efficiency (volume of spacecrafts/available payload volume) can be as low as 50%.

Because the adapter 100 must support the attached spacecraft with minimal movement during launch, its weight can range from 400 pounds to over 600 pounds. The fairing 185 surrounding the spacecraft of each adapter can amount to well over 1000 pounds. In a typical configuration, the mass efficiency (mass of spacecraft/launch vehicle capacity) rarely exceeds 50% due to the mass of the adapter, fairing, and other 'overhead' items.

Another problem with the ESPA architecture is the creation of convoluted load paths, as illustrated by the arrows 190 in FIG. 1C, which lead to potentially large deflections 195 that are difficult to prevent without adding substantial mass to the supporting elements. The potentially large deflections 195 also necessitate constraints on the spacecraft's dynamic envelope, to avoid collisions between spacecraft during launch.

Additionally, the ESPA architecture does not provide a means to control the deployment of the spacecraft. When the launch vehicle is in the proper deployment location, after the fairing has been released, the coupling between the flanges 120-130 is released and the space vehicle 'tumbles away' until its internal navigation and propulsion systems direct it to its proper station.

The ESPA architecture also does not facilitate retrieval of derelict spacecraft. Particularly with the increasing use of satellite 'constellations' that comprise multiple satellites, in some systems thousands of satellites, in low earth orbit, the need to be able to remove 'space junk' has become a pressing problem. However, due to the varying shapes of spacecraft permitted in the ESPA architecture, a custom designed retrieval craft will likely be required for each differently shaped spacecraft, which will likely be determined to be infeasible.

The ESPA architecture typically requires that the spacecraft are added to the ESPA when the ESPA is in the horizontal position, and attached to the launch vehicle in the horizontal position. The launch vehicle must subsequently be lifted to the vertical position for launch.

U.S. Pat. No. 5,522,569, issued 4 Jun. 1996, to Steffy et al. discloses a "SATTELITE HAVING A STACKABLE CONFIGURATION" that provides mass and volume efficiency, with a simplified load path. Relatively short cylindrical satellites of the same diameter are stacked and bolted to each other using three coupling devices arranged on the perimeter of each satellite. The bolts are secured using separation nuts that release the bolts for deployment; a spring mechanism in each coupling device propels the top-most satellite away from the stack. The bolting of each satellite to each other, and the lowermost satellite in the stack to the launch vehicles, provides a self-supporting structure with linear loading, with each set of couplers being preloaded (torqued) to minimize deflection of the stack. However, this self-supporting structure is particularly well suited for uniformly short cylindrical satellites, but if a tall satellite is included in the stack, the wall structure of the tall satellite would need to be sufficiently reinforced to avoid unwanted stack deflection.

U.S. Pat. No. 5,129,601, issued 14 Jul. 1992, to Henkel, discloses a "JACK SCREW PAYLOAD DEPLOYMENT SYSTEM" that uses a set of three motor-driven screws on a baseplate that is attached to the launch vehicle. The motor-driven screws are threaded into attachment fittings (nuts) on the space vehicle to attach the space vehicle to the baseplate. By un-screwing the screws at a predetermined speed, the space vehicle can be 'launched' from the baseplate at a desired velocity. However, this arrangement is a single space vehicle deployment system, because once the space vehicle is screwed down to the baseplate, the screws cannot be further rotated to accept other space vehicles. If multiple space vehicles are threaded onto the screws sequentially, the screws will again cease rotation when the lower space vehicle reaches the baseplate, preventing the preloading (torquing) of the upper space vehicles, rendering the stack unstable for launch.

It would be advantageous to provide a system and method for installing, deploying, and recovering a plurality of spacecraft that provides an ease of use and structural stability that is not currently available in existing spacecraft deployment systems. It would be of further advantage to provide a system and method that supports a standardization of spacecraft design that enables spacecraft from different sources to be efficiently arranged within the launch vehicle.

These advantages, and others, can be realized by defining a standard, or family of standard dimensions for the exterior shape of each spacecraft, with well-defined placement of internal structures that facilitate the coupling of multiple spacecraft in a stack above a baseplate that is configured to be fixedly attached to the launch vehicle.

In an embodiment of this invention, a plurality of threaded rods are arranged orthogonal to a surface of the baseplate, and each spacecraft includes a channel through which each rod can traverse. Each spacecraft also includes a coupling mechanism that selectively engages or disengages each threaded rod. Each spacecraft is added to the stack by having the coupling mechanism engage the threaded rods while the coupling mechanisms of each of the preceding spacecraft is disengaged. When the coupling mechanism is engaged and the threaded rods are rotated, the spacecraft travels along the threaded rods toward the baseplate; when the coupling mechanism is disengaged, the threaded rod is free to rotate. When all the spacecraft are added to the stack, the threaded rods engage a terminator component, which may be the nosecone of the launch vehicle, and are rotated while the coupling mechanisms in all of the spacecraft of the stack are disengaged. The threaded rods are screwed into the terminator component, thereby preloading the stack to the baseplate to withstand the loads introduced during launch.

To deploy the spacecraft from the launch vehicle, the process is reversed. The terminator component is released by unscrewing the threaded rods while the coupling mechanisms of all the spacecraft are disengaged. Upon release of the terminator component, the coupling mechanisms of each spacecraft in the stack engages the treaded rods, thereby enabling all the spacecraft to travel along the threaded rods, away from the baseplate, when the threaded rods are further rotated. As each spacecraft nears the end of the threaded rod, the rotation speed of the threaded rod is controlled to provide the appropriate escape velocity to the spacecraft. The rotation of the threaded rod is also controlled to provide a controlled separation between each subsequent spacecraft.

The spacecraft deployment system of this invention may also be used to retrieve spacecraft, thereby reducing the amount of 'space junk' that remains in orbit after the spacecraft has completed its mission. In such an embodiment, the remainder portion of the launch vehicle with the baseplate and threaded rods is directed to the spacecraft that is to be retrieved. The threaded rods enter the channels of the spacecraft, and the coupling mechanism of the spacecraft is engaged to travel along the threaded rods, toward the baseplate, when the threaded rods are rotated. As each subsequent spacecraft is engaged, the coupling mechanisms of each spacecraft on the stack disengages the threaded rods to enable the threaded rods to rotate. If the nosecone is available for retrieval, it is retrieved and used as the terminator component to preload the stack for re-entry; otherwise, the topmost spacecraft's coupling mechanisms are engaged to serve as the terminator component.

In prior generations of spacecraft launches, an overriding design criterion was "mass to orbit", because additional mass requires additional fuel for the launch vehicle. The inventors have recognized that in subsequent generations, the "mass to orbit" criterion has been replaced by "area to orbit", particularly in low earth orbit (LEO) deployments. A majority of spacecraft missions are either collecting data from earth or providing data to earth, or both. In such cases, the 'aperture' of the collecting or providing element, such as an antenna, can substantially affect the design complexity. For example, a small collecting antenna will require substantially more complex filters and amplifiers than a large collecting antenna, due to the lower signal-to-noise (S/N) ratio of signals from the smaller antenna. These more complex components will also require more power, requiring a larger solar array. In like manner, a small providing antenna will require more power to achieve the same signal-to-noise ratio at a receiver than a large providing antenna.

In embodiments of this invention, the spacecraft are preferably cylindrical, and fill the entirety of the area within the launch vehicle. Preferably, the outer surface of each cylindrical spacecraft forms the outer surface (fairing) of the launch vehicle. This 'dual-use' of the spacecraft's exterior reduces the overall launch mass, and the cylindrical shape provides enhanced structural stability to the spacecraft. Additionally, by filling the available area with a cylindrical spacecraft, the height (thickness) of the spacecraft can be reduced to achieve the same volume provided by conventional spacecraft. These thinner spacecraft also provide a lower center of mass of the stack of spacecraft, which reduces deflection stress on the stack.

The cylindrical spacecraft may also be configured to have its operational (electronic) components situated primarily along its outer perimeter, thereby allow for a hollow space about its center axis. This hollow space reduces the mass of the spacecraft, and/or provides space for stowage of 'external' components, such as solar panels that are deployed when the spacecraft is released from the launch vehicle, or propellent canisters that are used for maneuvering one or more spacecraft to desired orbital locations.

In embodiments of this invention, an Orbit Service Module (OSM) is situated at either end of the stack of spacecraft, and includes the components used for orbital placement, spacecraft separation and retrieval, and other services in support of the payloads.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1A:
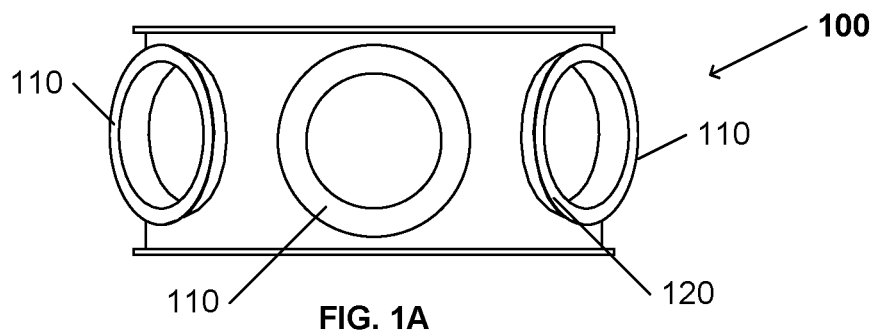
FIGS. 1A-1C illustrate an example prior art spacecraft deployment system.
Figure 1B:
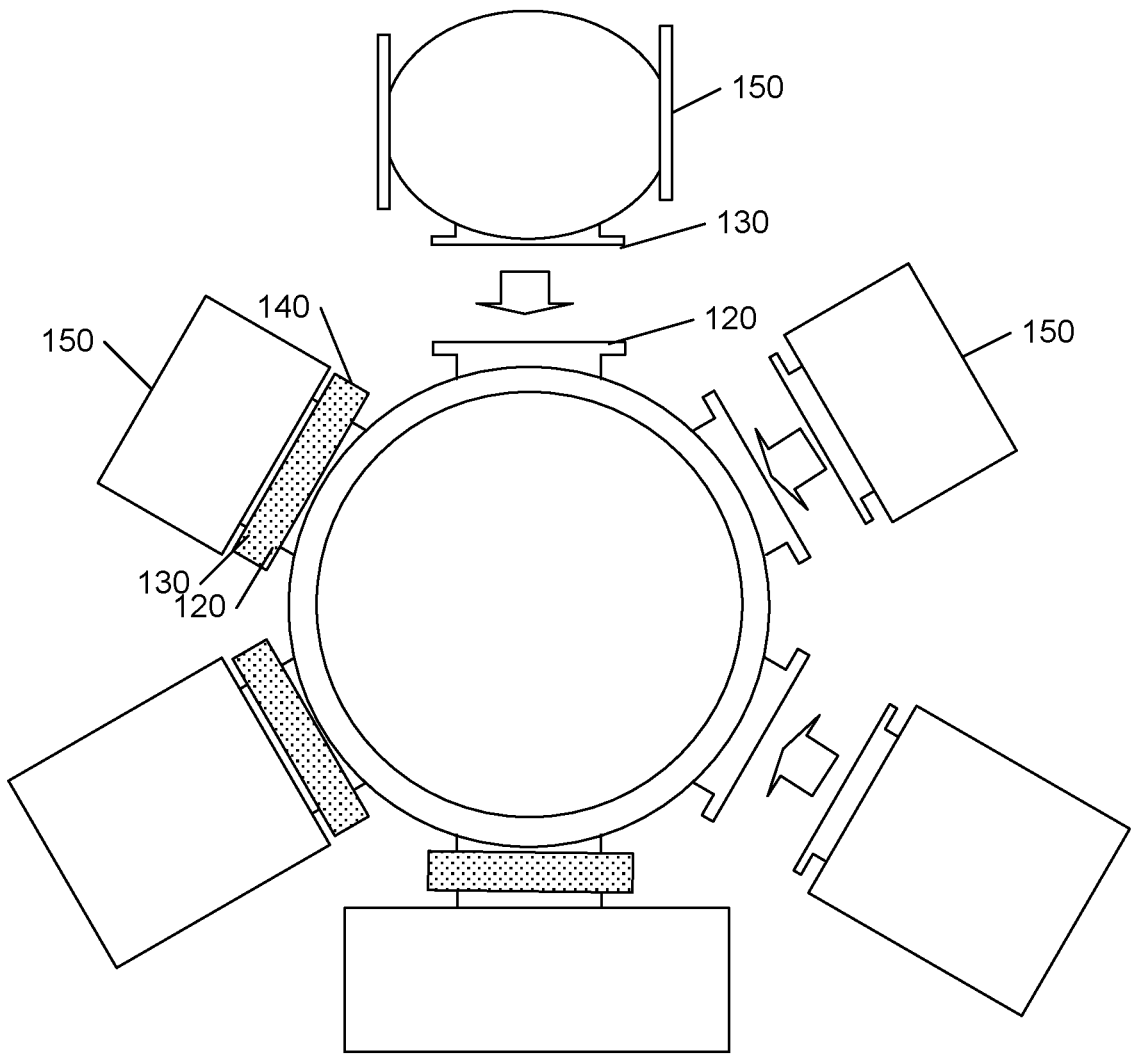
Figure 1C:
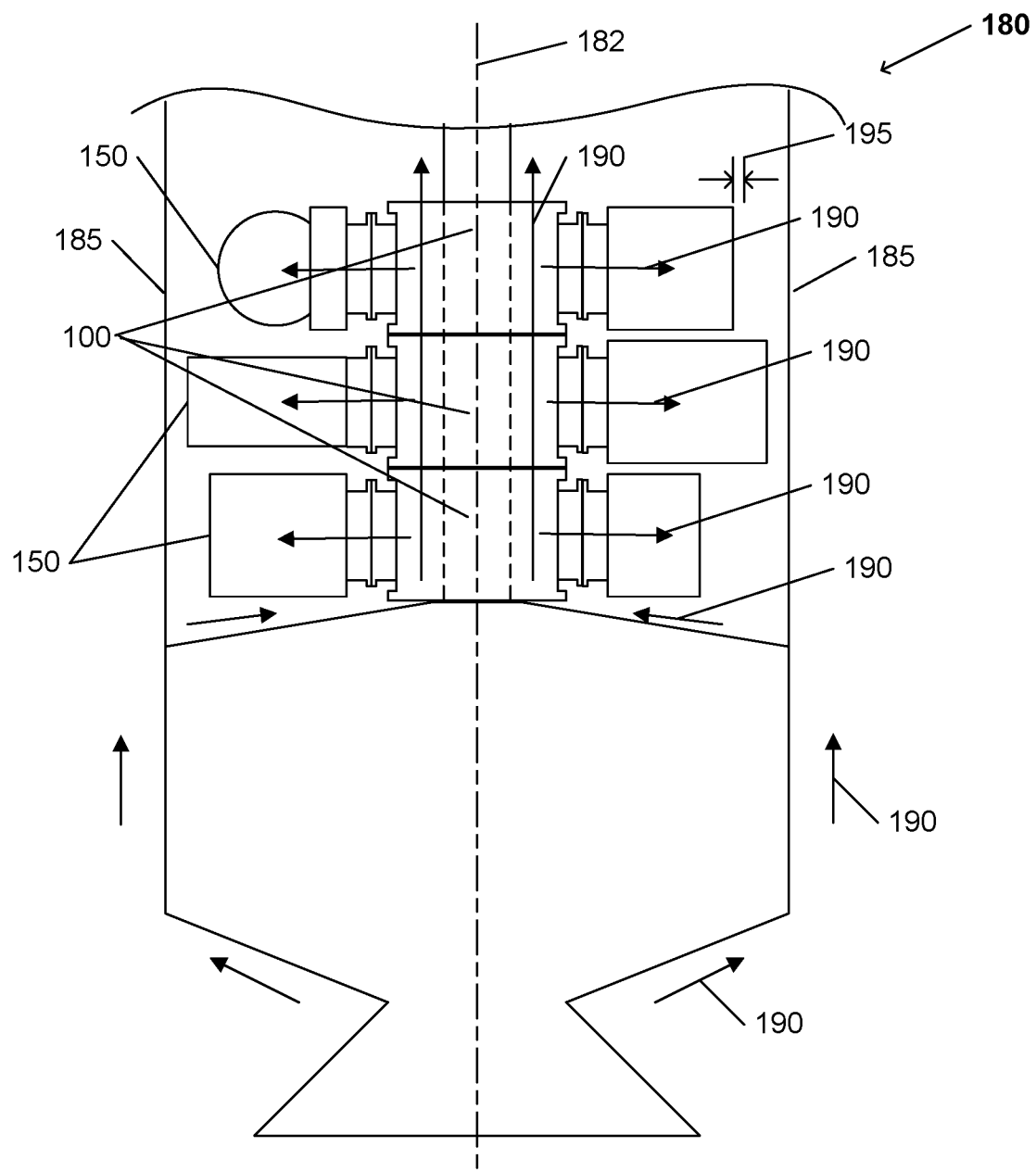

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Additionally, for purposes of explanation, the following terms are used herein, with accompanying explanation. These explanations are provided for ease of understanding, and are not intended to limit the claimed invention beyond the limits expressly included in the claims.

Actuator: a mechanical device for moving or controlling another device.

Baseplate: a lowest structure in the stack of spacecraft, configured to be fixedly attached to the launch vehicle.

Bolt: a rod with a helical thread.

Coupling mechanism: a structure that is able to selectively join the spacecraft to a rod.

Deployment element: an element along which the spacecraft travels as it is being deployed.

Deployment system: a system that. controls the deployment element and the coupling mechanism of each spacecraft.

Enclosure: the 'body' of the spacecraft. within which at least some mission-specific components are situated.

Fairing: a structure that provides a smooth outline and reduces drag; may include a plurality of individual components arranged to provide the smooth outline.

Orbital Service Module (OSM): a module that controls the deployment of spacecraft via the deployment system; may include navigation and maneuvering elements.

Launch vehicle: a rocket used to launch spacecraft.

Nosecone: a protective cone constituting the forward end of a launch vehicle.

Nut: a device with an internal thread that engages the thread of a bolt; as used herein, the nut need not completely encircle the bolt.

Preload: application of stress to a mechanical system; as used herein, a compression force to increase the rigidity of the stack of spacecraft.

Rack: a bar with teeth for operating with a pinion or worm gear to transform rotary motion to linear motion or vice versa.

Rod: a straight slender bar,

Stack of spacecraft: a plurality of spacecraft arranged vertically above a baseplate and/or below a nosecone.

Spacecraft: a vehicle or device designed for travel or operation outside the earth's atmosphere.

Terminator component: a topmost structure in the stack of spacecraft, configured to preload the stack to the baseplate.

Threaded rod: a rod with a plurality of grooves or one or more helical grooves.

FIG. 2 illustrates an example embodiment of a spacecraft deployment system that uses aspects of this invention. In this embodiment, a stack 220 of spacecraft 221-229 is situated upon a baseplate 210 that is fixedly attached to the final stage 270 of a launch vehicle 280. Threaded rods 230 extend through channels (330 in FIGS. 3A-3B) in each spacecraft 221-229, and into terminator components 250, which are illustrated as being situated in the nosecone 260 of the launch vehicle 280. One of skill in the art will recognize that the terminator component 250 may be any component that receives and captures the terminal end of the threaded rods 230. Optionally, protective elements, such as 0-rings, EMI gaskets, etc. may be placed between the spacecraft 221-229.

Each spacecraft 221-229 includes coupling mechanisms 235 that selectively engage or disengage the threaded rods 230. When the coupling mechanisms 235 of a spacecraft are engaged, the rotation of the threaded rods 230 cause the spacecraft to travel along the threaded rods 230, either toward the baseplate 210 for adding the spacecraft to the stack 220, or away from the baseplate 210 for removing the spacecraft from the stack 220.

In the example of FIG. 2, each threaded rod 230 is driven by an actuator 240 that selectively rotates the rod 230 under the control of a deployment control system (not illustrated). The deployment control system synchronizes each actuator 240 of the stack with each other actuator 240 so that the spacecraft moves uniformly along each threaded rod 230 when its coupling mechanisms 235 are engaged. The coupling mechanisms 235 may be 'active' or 'passive', wherein an active coupling mechanism 235 is controlled by the deployment control system and/or the spacecraft as disclosed in U.S. patent application 16/511,864. A passive coupling mechanism 235, detailed further below, does not require external control, per se. In an active control coupling system, the coupling mechanisms 235 of each spacecraft are similarly synchronized to uniformly engage or disengage the threaded rods 230.

As noted above, each spacecraft 221-229 is added to the stack by situating the rods 230 into channels of the spacecraft and enabling the coupling mechanisms of the spacecraft to engage the threaded rods 230. The channels may be flared at the bottom of the spacecraft to facilitate the entry of the rods 230 into the channels. While the coupling mechanism 235 of the spacecraft to be added is engaged, the coupling mechanisms of all spacecraft currently on the stack are disengaged from the threaded rods 230, allowing the threaded rods 230 to rotate, thereby propelling the spacecraft along the threaded rods 230 toward the baseplate 210.

An advantage of this arrangement is that the spacecraft can be attached to the launch vehicle while the launch vehicle is in the vertical position. The baseplate is attached to the launch vehicle while the launch vehicle is vertical, and the threaded rods 230 extend vertically. Each spacecraft is placed at the top of rods 230 and lowered toward the baseplate as detailed above. The nosecone is then added, and the rods 230 are torqued to achieve the desired pre-loading of the structure. The coupling mechanisms of each spacecraft is disengaged to enable the threaded rod to be properly torqued to the terminator component to achieve the desired pre-loading of the stack.

Figure 2A:
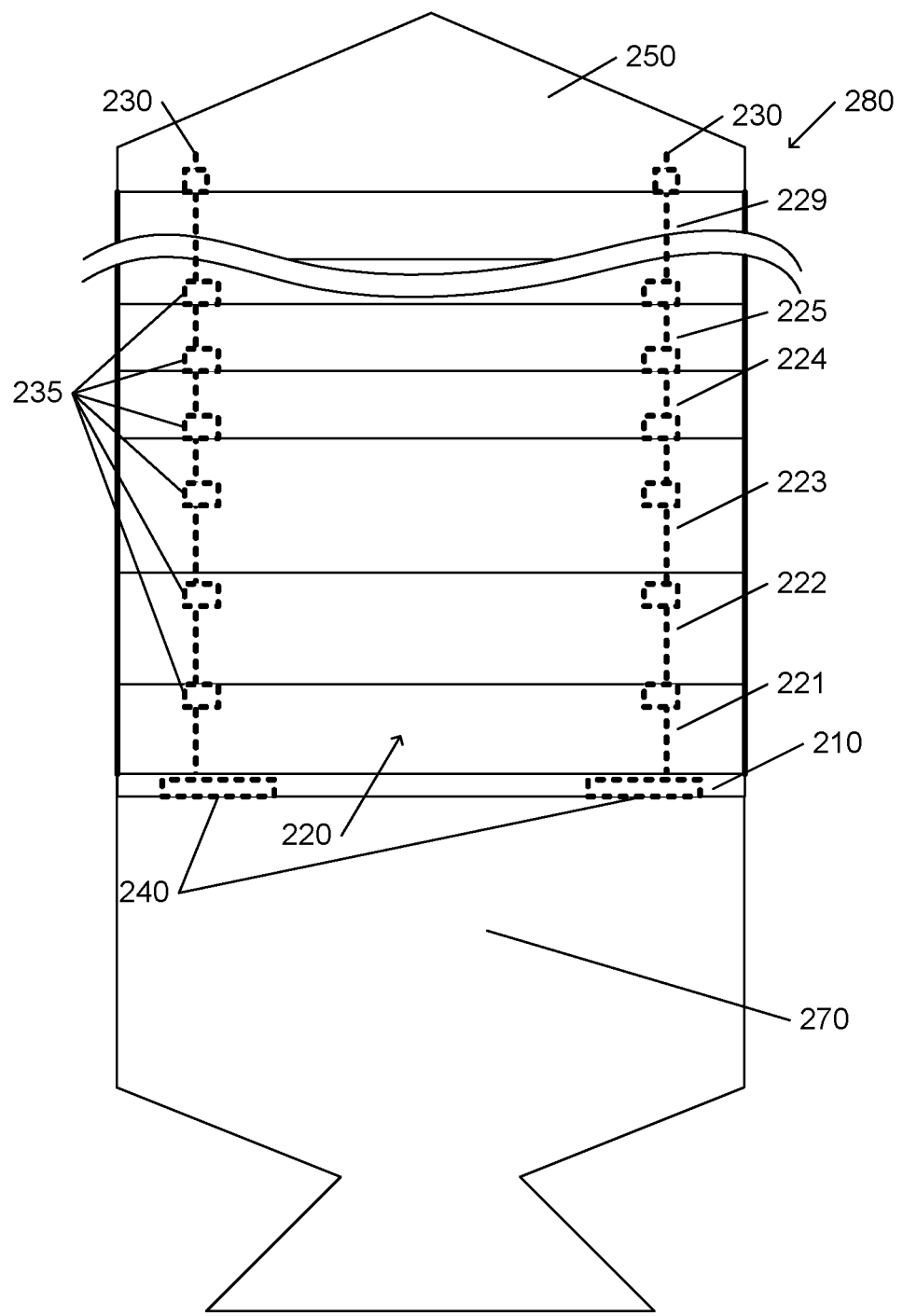
FIG. 2A-2B illustrate example spacecraft deployment systems using aspects of this invention.
Figure 2B:
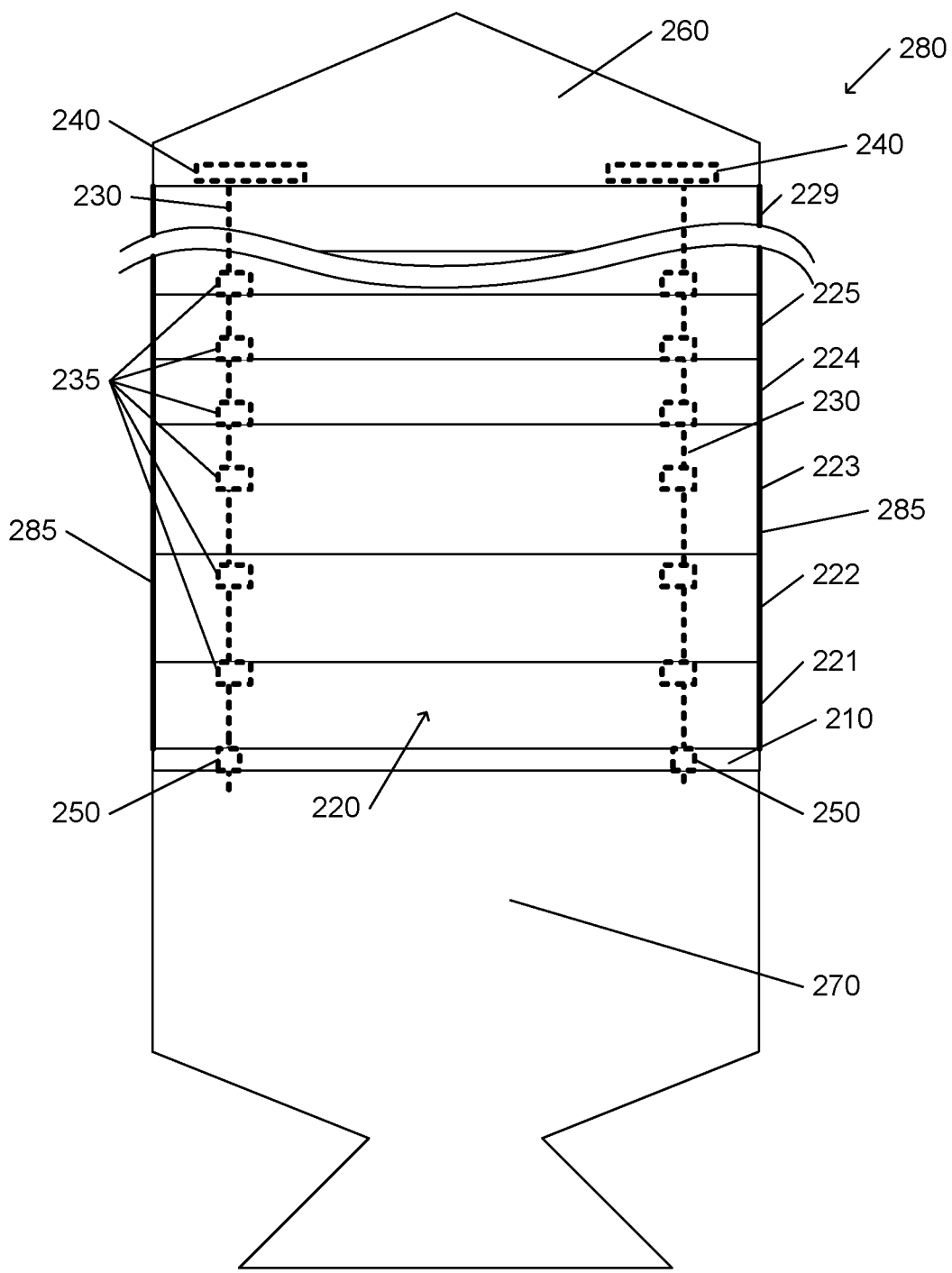

In an alternative embodiment, as illustrated in FIG. 2B, the location of the actuators 240 and terminators 250 are reversed, such that the actuators 240 are located in the nosecone 260, and the terminators 250 are situated in the baseplate 210. In this embodiment, the spacecraft 221-229 are secured to the nosecone 260, and the composite assembly (260, 221-229) is secured to the baseplate 210 of the final stage 270 of the launch vehicle. This configuration minimizes design changes to a conventional final stage 270, and enables a segregation of spacecraft-launch functions and spacecraft-deployment functions, thereby simplifying the complexities of integrating these functions in the launch vehicle. Preferably, the nosecone is situated in an 'upside-down' orientation, and the spacecraft are lowered to create the stack above the inverted nosecone. The stack, with nosecone, is then inverted, coupled to the baseplate, and the rods are torqued to provide the required pre-load. The symmetry and structural integrity of the stack greatly simplifies the task of inverting the stack and nosecone.

In embodiments of this invention, the deployment system, comprising at least the actuators 240, threaded rods 230, and deployment control system (not illustrated), may be situated in a spacecraft that serves as an Orbital Service Module (OSM), detailed further below. In this embodiment, the OSM is detachably coupled to the baseplate or the nosecone as the first spacecraft of the stack. Thereafter, the OSM sequentially receives the other spacecraft forming the stack.

As detailed further below, in embodiments of this invention, each spacecraft is cylindrical and preferably comprises an outer surface that serves as fairing for the launch vehicle, as illustrated by the thicker lines 285 in FIGS. 2A-2B, thereby eliminating the need for a separate fairing to enclose the stack of spacecraft.

By arranging the spacecraft 221-229 in a vertical stack, the load path is along the rods 230 and the accompanying channels 330 in each spacecraft. This vertical loading substantially reduces the complexity of load management as discussed above with respect to prior art ESPA system, as well as substantially reducing the potential deflection 195 of the ESPA deployment system. Also as compared to the ESPA deployment system, the volume consumed by each spacecraft is substantially reduced, as well as the volume required to accommodate the supporting adapter 100 in the ESPA launch vehicle.

In preparation for launch, the stack is preloaded by rotating the threaded rods into the terminator component 250 at the nosecone 260 (FIG. 2A) or the baseplate 210 (FIG. 2B). In an embodiment of this invention, the threaded rods may be ⅜"-1" diameter metal rods, and are torqued to produce a preload of at least 5,000 lbf. to minimize movement of the stack during launch.

To deploy the spacecraft 221-229 after launch, while all of the coupling mechanisms of the spacecraft 221-229 are disengaged, the actuators 240 are enabled to unscrew the threaded rods 230 from the terminator component 250. Thereafter, the coupling mechanisms of each spacecraft on the stack 220 are engaged to unscrew all the spacecraft from the stack. Sensors (not illustrated) on each spacecraft may detect where the spacecraft is positioned along the threaded rod, or merely whether or not the threaded rod is partially within the spacecraft. When the spacecraft is approaching the end of the threaded rod, the spacecraft may communicate with the deployment system, and the deployment system may cease the rotation of the threaded rod until the intended deployment location is approaching, at which point the deployment system will resume its rotation of the threaded rod to eject the spacecraft from the remaining stack.

The deployment velocity of the spacecraft may be precisely controlled by controlling the rotation speed of the threaded rods 230, and higher velocities may be achieved compared to conventional spring-loaded deployments. Additionally, by projecting the spacecraft from the threaded rods 230, the likelihood or degree of tumbling is substantially reduced.

Although the spacecraft will typically be deployed individually, multiple spacecraft may be released in quick sequence by initially creating a space between the spacecraft, then simultaneously engaging each of the coupling mechanisms of each of the multiple spacecraft. Alternatively, the multiple spacecraft could be deployed by sequencing the engagement of each spacecraft without waiting for the upper spacecraft to be completely deployed from the threaded rods 230.

After deploying all of the spacecraft from the stack, the deployment system may be used to retrieve other spacecraft by guiding the threaded rods 230 into the channels of the spacecraft to be retrieved and using the techniques detailed above to create a stack of satellites atop the baseplate 210 or the nosecone 260. To provide pre-loading, the last spacecraft on the stack may engage its coupling mechanism 235 to serve as the terminator component.

Figure 3A:
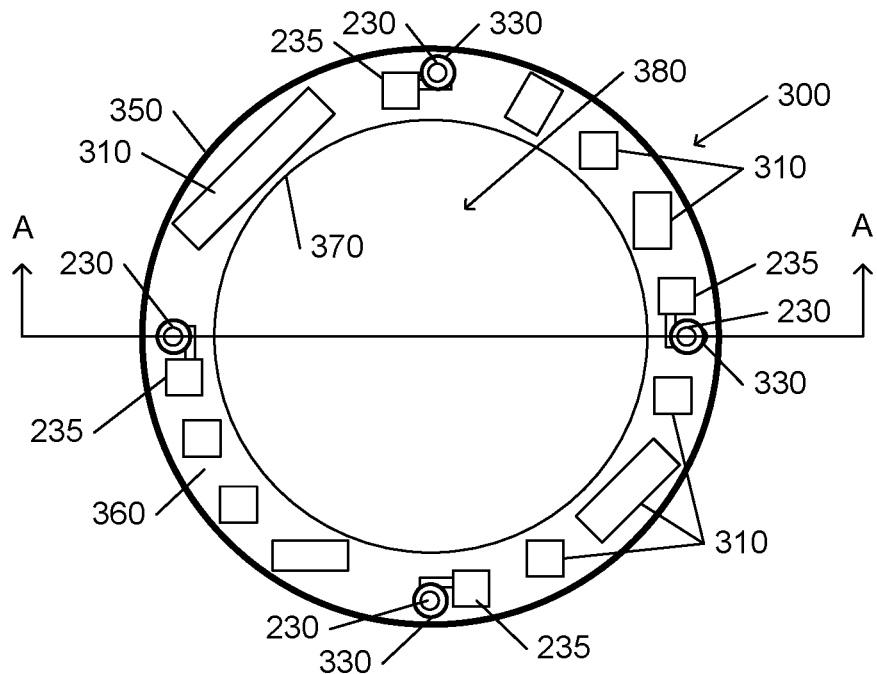
FIGS. 3A-3C illustrate an example cylindrical spacecraft using aspects of this invention.
Figure 3B:
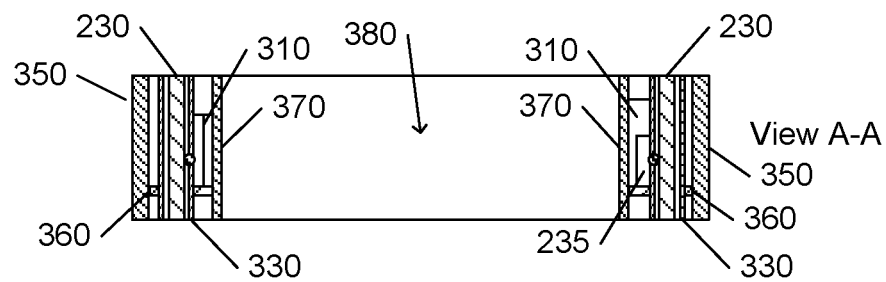
Figure 3C:
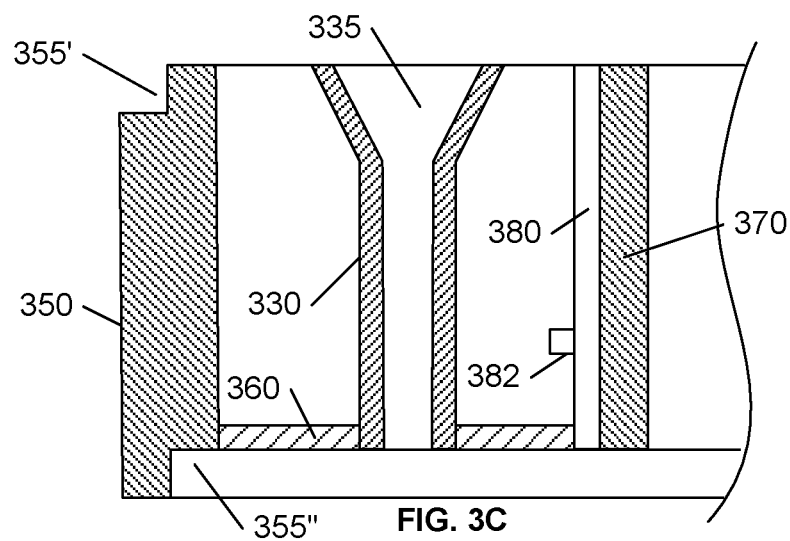

FIGS. 3A-3C illustrate an example embodiment of a spacecraft 300 using aspects of this invention. As illustrated in FIGS. 3A-3B, the spacecraft 300 is cylindrical, with four channels, or conduits 330 uniformly situated around the spacecraft. Each channel 330 allows the threaded rod 230 to traverse through the spacecraft 300. The channels 330 are preferably structured to provide support to the stack when the threaded rods 230 are attached to the terminator component and preloaded. The outer wall 350 serves as fairing to the launch vehicle and provides reactive forces to shear forces during launch to minimize potential rotational deflection of the stack. In some embodiments wherein the outer wall 350 provides sufficient support to the stack when the stack is preloaded, the channels 330 may merely be open space through which the rods 230 pass to the coupling mechanisms 235 and through to the next spacecraft in the stack.

Coupling mechanisms 235 selectively engage or disengage the threaded rods 230. The threaded rods 230 are typically operated synchronously to uniformly engage the coupling mechanisms in the spacecraft; but preferably, they may be independently controllable in the event that they become unsynchronized, causing a non-orthogonal force to be applied to the spacecraft as the threaded rods 230 turn. The actuators 240 and threaded rods 230 preferably have sufficient torque to overcome misalignments and possible 'jams'.

Although the spacecraft of FIGS. 3A, 3B has a cylindrical shape with four threaded rods 230, one of skill in the art will recognize that the number of rods 230 may vary, depending upon the diameter of the spacecraft. Preferably, at least three threaded rods 230 are used to maintain a proper orientation of the spacecraft as it is deployed.

One of skill in the art will also recognize that additional rods that are only threaded to couple to the terminator component 250 may be used for preloading the stack. In such a configuration, the threaded rods 230 may be used only to transfer the spacecraft onto or off the stack 220. One of skill in the art will also recognize that a separate set of threaded rods 230, with accompanying actuators 240, may be used to create the stack of spacecraft and another set, or pairs of sets, with actuators 240, may be used to couple the pre-formed stack to terminal connectors 250 at the nosecone 260 and/or baseplate 210. Alternatively, the actuators 240 and rods 230 may be used to create the stack of spacecraft, and alternative means, such as a Motorized LightBand (MLB) from Planetary Systems Corporation, may be used to secure the stack of spacecraft to the nosecone 260 and/or baseplate 210.

Also illustrated in FIGS. 3A-3B, an inner wall 370 forms a hollow space 380 in the center of the spacecraft. This inner wall 370 is illustrated as a cylinder that is concentric with the outer wall 350, but in other embodiments, the wall 370 may be a set of wall sections that form a polyhedron that is concentric with the outer wall 350. The wall 370 need not be concentric, but being concentric facilitates maintaining a balance of mass.

A platform 360 extends between the outer wall 350 and inner wall 370. This platform provides a surface for mounting the coupling mechanisms 235, as well as other components 310 that provide the functions of the spacecraft after deployment. These other components 310 may also provide other functions, such as pre-launch and deployment functions.

Conventional spacecraft typically concentrate their contents in the center of the spacecraft to conserve volume, leaving space between the body of the spacecraft and the interior of the launch vehicle for ancillary components, such as solar arrays and antennas. However, the inventors have recognized that greater volumetric efficiency can be achieved by extending the spacecraft to the full diameter of the launch vehicle. In this manner, the volume required for the components 310 can be accommodated by situating the components 310 along this larger perimeter of the spacecraft.

For example, consider a situation wherein the mission-specific components require eight cubic feet of volume. A centrally located configuration would nominally require a space of 2'×2'×2', or a spacecraft having a nominal height of two feet. Consider a launch vehicle (and corresponding spacecraft) having a six-foot interior radius. It can be shown that a four-inch platform 360 that runs along the inner wall of the spacecraft can accommodate the required eight cubic feet with a nominal height of under eight inches. As noted above, this configuration also enables the spacecraft to accommodate ancillary components, such as solar panels and antennas, in the hollow space at the center of the spacecraft (in this example, a space that spans over ten feet).

Another advantage of a thin, flat spacecraft is its aerodynamic stability. Although most spacecraft travel at Low-Earth-Orbit (LEO) elevations, there remains some aerodynamic resistance, particularly at the lower LEO elevations.

The efficiency of communications is inversely proportional to the square of the distance between the transmitter and receiver. At lower the spacecraft elevations, as with larger aperture size, the power requirements and filtering complexity are reduced, enabling the use of smaller solar arrays and fewer and/or smaller electronic components. However, atmospheric density is higher at lower elevations, and conventional 'bulky' spacecraft are unable to maintain orbital velocity at very low LEO elevations. Like a FrisbeeTM, however, there is little aerodynamic resistance when the spacecraft is traveling edge-on through the (rarified) atmosphere, thereby enabling the spacecraft to orbit at very low LEO elevations.

The aerodynamic shape of a thin, flat spacecraft also facilitates de-orbiting the spacecraft. If the spacecraft is rotated, so that its wide-diameter flat side is presented to the atmosphere, the aerodynamic resistance will increase, and the spacecraft will lose altitude.

The structural components of the spacecraft 300 may include features that facilitate efficient coupling between the spacecraft. For example, the outer wall (fairing) 350 may include features 355', 355" that serve to 'interlock' the spacecraft on the stack, and to provide a smooth fairing profile. In like manner, the channel 330 may be flared at one or both ends to facilitate entry of the threaded rod. The inner wall 370 may also be configured to facilitate coupling to the stack of spacecraft, such as notches and tabs (not illustrated) that serve as a 'key' to properly align the spacecraft in the stack.

An additional coupling element 380 is illustrated in FIG. 3C that enables communication between the spacecraft 300 and the deployment system, and optionally, the other spacecraft on the stack. A port 382 is provided to communicate control signals from the deployment system to the spacecraft 300, and optionally, from the spacecraft 300 to the deployment system and other external systems, such as launch control systems. One of skill in the art will recognize that the functions of this coupling element 380 may optionally be integrated into the channel 330.

Other features may be included in the spacecraft forming the stack. For example, one or more conduits may be integrated into each spacecraft with 0-rings or similar sealing elements for joining the conduits when the stack is completed and pre-loaded, thereby enabling fluids or gasses to travel through the conduits for the length of the stack. The individual spacecraft may optionally include ports to the conduits to access the material in the conduit as required. In some embodiments, these conduits extend through the length of the launch vehicle, potentially eliminating the need for external conduits on the launch gantry.

As is common in spacecraft design, different entities may provide the different components required to equip the spacecraft to perform its mission. For example, an entity may provide the basic spacecraft comprising the outer wall 350 and attached coupling mechanisms 235, with features that enable the addition of the inner wall 370 and platform 360, thereby enabling the custom-design of platforms and hollow spaces as required for accommodating the mission-specific or other components. That is, this embodiment of outer wall 350 and coupling mechanisms 235 is fully equipped to be deployed in space, freeing the mission-specific designer from launch and deployment tasks.

In like manner, the spacecraft may further comprise a standardized inner wall 370 and platform 360 to provide a pre-defined space/volume for customized mission-specific components by the mission provider. Similarly, each of these example spacecrafts may be available in a variety of standard outer wall 350 heights to accommodate different volume requirements of the mission-specific components.

Of particular note, the design of the spacecraft can be standardized using only a few parameters: the 'bolt circle' parameters, the outer diameter, axial and lateral stiffness, and the screw form. The bolt circle parameters define where the threaded rods traverse the spacecraft relative to the center axis, and the minimum radius of the apertures for the threaded rods. If the spacecraft are to contain the aforementioned conduits, a similar set of conduit circle parameters may be included in the standard. The screw form may include the pitch of the threads, the width of the threads, and so on. With the adoption of these standards, the designers of mission-specific systems are assured of being able to secure launch services from launch service providers that conform to these standards. In like manner, the launch service provider can provide launch services to a variety of mission-specific design providers with confidence that each spacecraft is compatible and structurally sufficient.

Figure 4A:
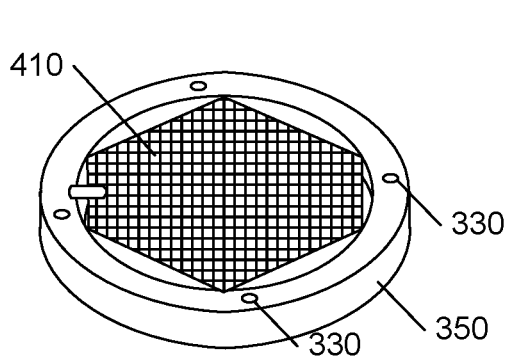
FIGS. 4A-4B illustrates an example spacecraft with a deployable solar panel using aspects of this invention.
Figure 4B:
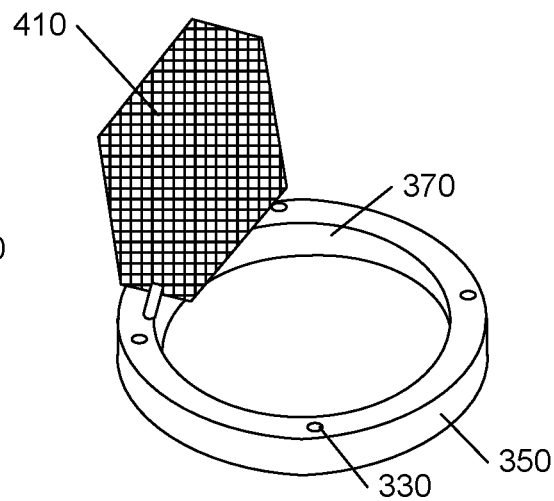

FIGS. 4A and 4B illustrate a spacecraft 300 comprising an ancillary component 410, such as a solar panel, antenna, etc. FIG. 4A illustrates the ancillary component 410 in the 'stowed' position within the hollow space formed by the inner wall 370. Upon deployment, the ancillary component may be deployed in its operational configuration, such as illustrated in FIG. 4B. One of skill in the art will recognize that multiple ancillary components 410 may be situated in the hollow space, depending upon the height of the satellite and the thickness of the ancillary components 410. These multiple components 410 may be deployed from both the 'top' and the 'bottom' of the spacecraft. One of skill in the art will also recognize that the ancillary component 410 may comprise multiple elements, such as multiple solar panels that are hinged together.

Figure 5:
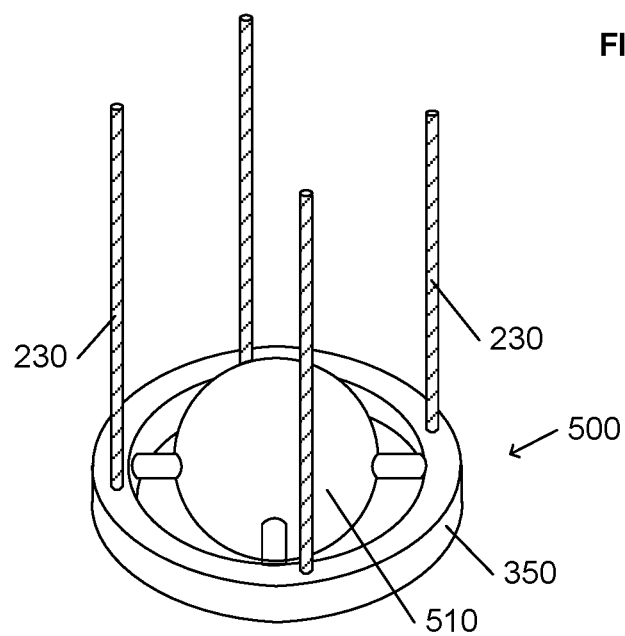
FIG. 5 illustrates an example Orbital Service Module (OSM) using aspects of this invention.

FIG. 5 illustrates another component 510 situated within the hollow space of the spacecraft. In this embodiment, the spacecraft is an Orbital Service Module (OSM) 500, and the illustrated component 510 is a container that contains propellant material. The OSM 500 comprises the deployment system, as illustrated by the deployment elements (threaded rods) 230 that are configured to couple the satellites as a stack, and to deploy the satellites when the stack is released from the launch vehicle. In this embodiment, the OSM 500 will be configured to be detachably coupled to the baseplate or the nosecone, using either another set of threaded rods, or other coupling devices common in the art.

The OSM 500 includes navigation and maneuvering systems, as well as a controller (not illustrated) for controlling the deployment system. The maneuvering system is configured to situate and orient the OSM 500 to a proper position for deploying each spacecraft 300.

As noted above, the OSM 500 may also be configured to retrieve spacecraft 300. In this embodiment, the OSM 500 may also include sensors (radar, IR, etc.) that facilitate locating the target spacecraft and positioning the OSM 400 to enable the engagement of the coupling mechanisms 235 in the spacecraft 300. In this embodiment the OSM 500 and the spacecraft 300 may include communication devices for communicating the commands from the deployment system and receiving feedback from the satellite 300 as the retrieval progresses. The commands may include, for example, a command to stow or discard any previously deployed ancillary components 410.

In embodiments of this invention, the OSM 500 is attached to the nosecone 260, either fixedly or detachably. After stacking the retrieved spacecraft 300, the OSM 500 will maneuver for re-entry into the atmosphere, and will orient itself such that the nosecone 260 forms a heatshield for the OSM 500 and stack of retrieved spacecraft 300. In this configuration, either the nosecone 360 or the OSM 500 will deploy parachutes or other objects to slow the descent for a soft, or semi-soft landing, thereby enabling potential reuse of the retrieved spacecraft.

FIGS. 6A-6D illustrate an example coupling mechanism 235. In this example, the coupling mechanism is 'passive', such that the engaging and disengaging functions are performed without active participation from the spacecraft.

Figure 6A:
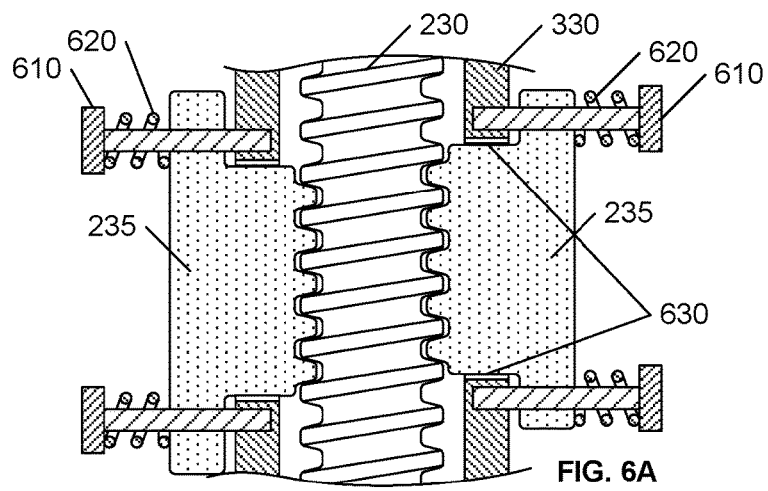
FIGS. 6A-6D illustrate an example coupling mechanism using aspects of this invention.

FIG. 6A illustrates the coupling mechanism 235 in an engaged state with the threaded rod 230. In this embodiment, the coupling mechanism 235 comprises a pair of toothed inserts that are situated in an aperture 630 in the channel 330 of the spacecraft. A pair of screws 610 with coaxial springs 620 secure the coupling mechanism 235 to the channel 330. The screws 610 are tensioned such that the springs 620 urge the toothed inserts into the threads of the threaded rod 230 with sufficient tension to enable the spacecraft to traverse along the threaded rod 230 when the threaded rod 230 is rotated.

Figure 6B:
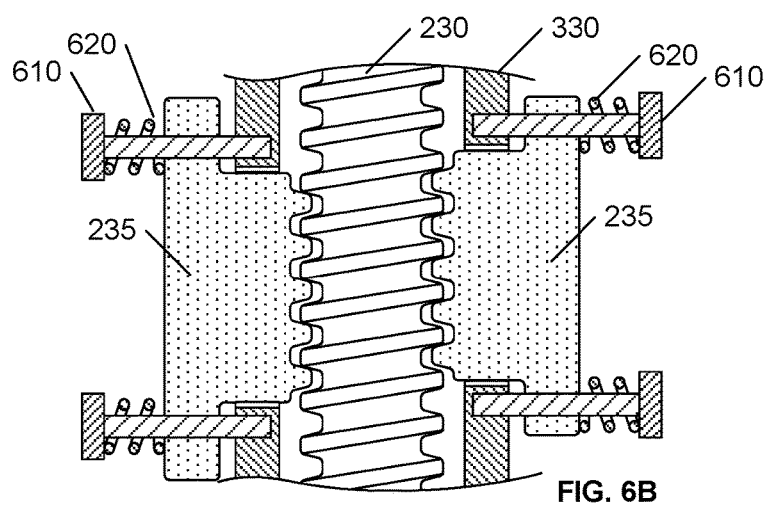
Figure 6C:
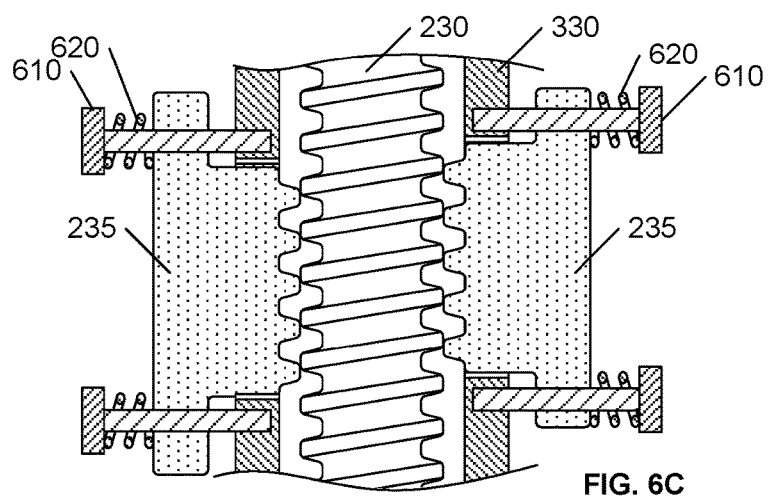
Figure 6D:
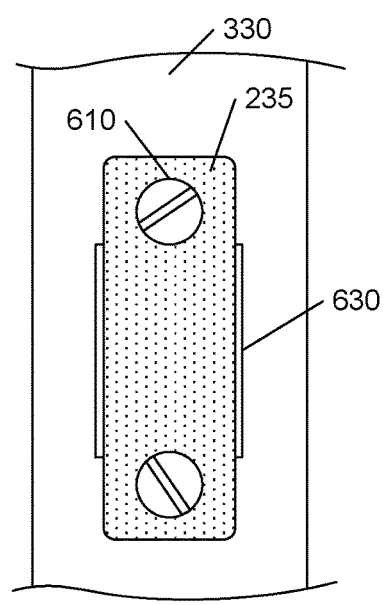

FIG. 6D illustrates a 'top view' of the channel 330 with the coupling mechanism 235 inserted into the aperture 630 in the channel 330 and secured by the screws 610 and (hidden) springs 620.

FIG. 6B illustrates a situation in which the spacecraft is fully situated on the stack such that further vertical movement is impossible. In this case, the tensioned springs 620 are insufficient to overcome the lateral component of the force that the threaded rod 230 will exert on the coupling mechanism 235 when the threaded rod 230 is further torqued and rotates. As illustrated in FIG. 6B, the space between the toothed insert 235 and the 'valleys' of the thread increases as the toothed insert is urged laterally by the rotation of the threaded rod 230 while the spacecraft is unable to move vertically.

As illustrated in FIG. 6C, a continued rotation of the threaded rod 230 will eventually force the coupling mechanism 235 out of the threads of the threaded rod 230, which will result in an 'automatic' disengagement of the coupling mechanism 235 from the threaded rod 230.

In operation, the tensioned springs 620 will cause the coupling mechanism 235 to engage the threaded rod 230 as each spacecraft 300 is lowered onto the stack by the rotation of the threaded rod 230. As each spacecraft 300 abuts the stack and cannot further move in the vertical direction, further rotation of the threaded rod 230 will cause the coupling mechanism 235 to disengage the threaded rod 230. When all the spacecraft are in the stack, the threaded rod 230 will be coupled to the terminal component 250 and rotated. This rotation will cause the disengagement of all the spacecraft from the threaded rod 230 as the threaded rod 230 is further torqued into the terminal component 250. This further torquing of the threaded rod 230 into the terminal component 250 may produce the pre-loading required to assure the structural integrity of the stack of spacecraft, although one of skill in the art would recognize that alternative means are available for providing pre-loading (e.g., stretching the rod) the stack, in addition to torquing.

In some embodiments, the terminal component 250 is a simple nut that is fixedly attached to the baseplate or the nosecone; in other embodiments, the terminal component 250 comprises a coupling mechanism 235 as illustrated in FIGS. 6A-6C, but is held fast to the channel 330 by shorter screws 610, without the spring 620, thereby preventing the coupling mechanism 235 from disengaging the threaded rod 230. In this embodiment, the coupling mechanism 235 is preferably metallic.

To facilitate engagement and disengagement, the toothed insert 235 of FIGS. 6A-6C may be made of a high-performance plastic, such as Polyether Ether Ketone (PEEK), or sintered polyimide, which can be expected to provide less surface friction than a metal insert. The teeth of the toothed insert 235 are preferably rounded to further facilitate disengagement from the threaded rod 230. In some embodiments, the teeth may be asymmetric, such that disengagement is facilitated when the threaded rod 230 is rotated in one direction (during the torquing to pre-load the stack), and resistance to disengagement occurs when the threaded rod 230 is rotated in the other direction (during deployment from the stack). In like manner, to avoid unintentional disengagement, a rachet mechanism may be employed to prevent disengagement in one direction and allow disengagement in the other direction.

Each spacecraft may also be configured to determine, and optionally report, its location along the rods. Such determination may be made, for example, to distinguish between the spacecraft actually contacting the lower spacecraft, baseplate, or nosecone, and the spacecraft encountering unexpected resistance (binding) as it travels along the rod. The location along the rod may also be used during the deployment of each satellite, to determine and/or control the velocity at which the spacecraft is deployed. In some embodiments, the location of the spacecraft may be used to synchronize or activate an operation of the launch vehicle, an operation of the controller that deploys the spacecraft, or an operation of the spacecraft itself, such as a determination of ignition of jets on the spacecraft.

In a simple embodiment, the number of rotations of the threaded rod from an initial starting state may be used to determine how far each spacecraft has traveled along the rod. In a more complex embodiment, the rod may include optical or mechanical markings that delineate locations along the rod, and the spacecraft may include an optical or mechanical detector, or both, that reads and decodes the markings. For example, the threads on the rod may include 'flats', and the spacecraft may include a cam arrangement that engages a counter as each flat is encountered. Electronic location detection techniques may also be used, wherein at different locations along the rod, a different electrical signal is received by a detector in the spacecraft; or, the spacecraft emits a signal and a controller in the baseplate determines the location of the spacecraft based on propagation characteristics of the rod.

A combination of techniques may also be used. For example, the rod may include visual markings at fixed intervals, with mechanical features that enable determining the location relative to the visual markers for a finer location determination.

The foregoing merely illustrates the principles of the invention. It will thus be appreciated that those skilled in the art will be able to devise various arrangements which, although not explicitly described or shown herein, embody the principles of the invention and are thus within its spirit and scope.

For example, although the structure of the rods has been disclosed as a solid rod with threads, one of skill in the art will recognize that alternative structures may be used. A hollow rod, for example, may provide a higher specific stiffness, or a given stiffness with less mass, than a solid rod. A hollow rod may also provide lower stress and wear on the actuators and/or higher rotational rates.

Although the invention is presented as having components on a relatively narrow platform that is adjacent the outer wall of the spacecraft, and a hollow space for accommodating ancillary components such as solar panels, one of skill in the art will recognize that in some embodiments, the platform may span the entire area within the outer walls, with no inner wall to form a hollow space, thereby allowing the conventional centrally-located placement of the mission-specific components.

Additionally, although the hollow space for ancillary components is defined for each satellite, a sharing-of-space may be used, wherein if one satellite's volume requirement exceeds the volume provided by its height, and another satellite does not require some or all of its hollow space, these satellites may be situated adjacently on the stack, such that the ancillary components of the first spacecraft may extend into the available hollow space of the second spacecraft. In like manner, specific portions of the hollow space of all the spacecraft on the stack may be reserved for components that are not able to be contained in a single spacecraft's hollow space.

These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) any of the disclosed devices or portions thereof may be combined together or separated into further portions unless specifically stated otherwise;
f) no specific sequence of acts is intended to be required unless specifically indicated; and
g) the term "plurality of" an element includes two or more of the claimed element, and does not imply any particular range of number of elements; that is, a plurality of elements can be as few as two elements, and can include an immeasurable number of elements.

We claim:
1. A spacecraft comprising:
an outer wall,
wherein the outer wall forms a part of an exterior surface of a launch vehicle; and
a plurality of coupling mechanisms,
wherein each coupling mechanism is configured to selectively engage a corresponding deployment element of a deployment system,
wherein an engagement of the deployment element during operation of the deployment system causes the spacecraft to travel in a direction parallel to a longitudinal direction of the deployment element,
wherein a disengagement of the deployment element causes the spacecraft to be substantially independent of the operation of the deployment system.

2. The spacecraft of claim 1, wherein the deployment element is a threaded rod, and the deployment system is configured to selectively rotate the threaded rod during the operation of the deployment system.

3. The spacecraft of claim 1, comprising:
one or more inner walls, and
a platform that extends between the one or more inner walls and the outer wall;
wherein the one or more inner walls forms a hollow space within the spacecraft.

4. The spacecraft of claim 3, wherein the plurality of coupling mechanisms are situated on the platform.

5. The spacecraft of claim 3, comprising mission-specific components that are situated on the platform.

6. The spacecraft of claim 5, comprising an ancillary component that is electrically coupled to at least one of the mission-specific components,
wherein at least a part of the ancillary component is situated in the hollow space formed by the one or more inner walls.

7. The spacecraft of claim 6, wherein the ancillary component comprises at least one of a solar panel and an antenna.

8. A spacecraft comprising:
at least one coupling mechanism that is configured to selectively engage at least one deployment element of a deployment system,
wherein an engagement of the deployment element during operation of the deployment system causes the spacecraft to travel in a direction parallel to a longitudinal direction of the deployment element, wherein a disengagement of the deployment element causes the spacecraft to be substantially independent of the operation of the deployment system;

an enclosure,
wherein the enclosure is cylindrical shaped,
wherein the enclosure comprises an outer wall and an inner wall,
wherein the inner wall creates a hollow region of the enclosure,
wherein the enclosure comprises a surface that extends between the inner wall and the outer wall;
wherein the at least one coupling mechanism is attached to the enclosure;
wherein the spacecraft includes at least one aperture to enable the at least one deployment element to traverse the spacecraft.

9. The spacecraft of claim 8, wherein the outer wall of the enclosure is structured to serve as a part of a fairing for a launch vehicle.

10. The spacecraft of claim 8, wherein the surface is configured to support mission-related components required for the spacecraft to operate after it is deployed.

11. The spacecraft of claim 10, wherein the spacecraft includes the mission-related components.

12. The spacecraft of claim 8, comprising at least one ancillary component that is situated in the hollow region prior to deployment of the spacecraft.

13. The spacecraft of claim 12, comprising at least one ancillary deployment component that is configured to move the at least one ancillary component out of the hollow region and into an operational configuration upon the deployment of the spacecraft.

14. The spacecraft of claim 12, wherein the at least one ancillary component includes at least one of a solar panel and an antenna.

15. The spacecraft of claim 12, wherein the at least one ancillary component includes a propellant container.

16. The spacecraft of claim 15, wherein the spacecraft comprises maneuvering components that enable the spacecraft to selectively adjust its trajectory.

17. The spacecraft of claim 8, wherein the outer wall includes features that facilitate a stacking of the spacecraft upon another spacecraft.

18. The spacecraft of claim 8, wherein the enclosure includes a conduit that forms the aperture through which the at least one deployment element traverses.

19. The spacecraft of claim 18, wherein the conduit includes conductors that enables the deployment system to communicate with the spacecraft.

20. The spacecraft of claim 18, wherein the conduit includes features that facilitate a coupling to a conduit of another spacecraft.

21. The spacecraft of claim 8, wherein the spacecraft includes electrical connectors that enable the spacecraft to couple to corresponding electrical connectors of other spacecraft.

22. The spacecraft of claim 8, wherein the deployment element comprises a threaded rod.

23. A spacecraft comprising:
a deployment system that is configured to deploy a plurality of spacecraft,
wherein each spacecraft of the plurality spacecraft is configured to selectively engage a plurality deployment elements of the deployment system,
wherein an engagement of the deployment elements during operation of the deployment system causes the spacecraft to travel in a direction parallel to a longitudinal direction of the deployment elements,
wherein a disengagement of the deployment elements causes the spacecraft to be substantially independent of the operation of the deployment system;
an enclosure,
wherein the deployment system is attached to the enclosure;
wherein the deployment elements extend beyond the enclosure, and are configured to pass into an interior of each of the plurality of satellites to enable the selective engagement of the deployment elements by each satellite.

24. The spacecraft of claim 23, wherein the deployment system includes actuators that are configured to rotate the deployment elements during the operation of the deployment system to effect the travel of the spacecraft along the deployment elements.

25. The spacecraft of claim 23, comprising a propulsion system that enables the spacecraft to alter its trajectory.

26. The spacecraft of claim 25, comprising a navigation system and a controller that controls the propulsion system based on communications with the navigation system.

27. The spacecraft of claim 25,
wherein the enclosure is cylindrical shaped,
wherein the enclosure comprises an outer wall and a concentric inner wall,
wherein the inner wall creates a hollow region of the enclosure,
wherein the spacecraft comprises containers that provide a propellant to the propulsion system,
wherein the containers are situated in the hollow region of the enclosure.

28. The spacecraft of claim 27, wherein the outer wall is structured to provide a part of a fairing of a launch vehicle.

29. The spacecraft of claim 23, wherein the enclosure comprises a nosecone of a launch vehicle.

30. The spacecraft of claim 23, wherein the deployment elements comprise threaded rods.

31. The spacecraft of claim 23, comprising one or more solar panels that are configured to extend beyond the enclosure when the spacecraft is detached from a launch vehicle.

32. A spacecraft comprising:
an enclosure;
a plurality of channels;
wherein the plurality of channels are attached to the enclosure;
a plurality of coupling mechanisms;
wherein the plurality of coupling mechanisms are attached to the plurality of channels;
wherein each coupling mechanism comprises a toothed insert that is configured to selectively engage a threaded rod;
wherein when the threaded rod rotates, the threaded rod exerts a force on the toothed mechanism to urge the spacecraft to travel in an intended direction parallel to a longitudinal direction of the threaded rod;
wherein if the spacecraft is able to travel in the intended direction, the rotation of the threaded rod causes the spacecraft to travel in the intended direction;
wherein if the spacecraft is unable to travel in the intended direction, the rotation of the threaded rod causes the toothed insert to disengage the threaded rod.

33. The spacecraft of claim 32,
wherein each coupling mechanism is attached to its channel via a spring-loaded screw;

wherein the spring-loaded screw exerts a force on the coupling mechanism that causes the toothed insert to engage the threaded rod when the spacecraft is able to travel in the intended direction;

wherein force exerted by the spring-loaded screw is unable to prevent the disengagement of the toothed insert from the threaded rod when the spacecraft is unable to travel in the intended direction.

34. The spacecraft of claim 32, wherein the enclosure is cylindrical and includes a hollow space within the cylinder.

35. The spacecraft of claim 34, wherein the enclosure comprises an outer wall that forms at least a portion of a fairing of a launch vehicle.

36. The spacecraft of claim 34, wherein the spacecraft comprises an ancillary component that is situated within the hollow space.

37. The spacecraft of claim 36, wherein the ancillary comprises one of: a solar array, an antenna, and a propellant container.

38. The spacecraft of claim 32, wherein the spacecraft comprises mission-specific components that are situated in the enclosure.

39. The spacecraft of claim 32, wherein teeth of the toothed insert are asymmetric to facilitate the disengagement of the toothed insert from the threaded rod when the threaded rod is rotated in a first direction, and to inhibit the disengagement of the toothed insert from the threaded rod when the threaded rod is rotated in a second direction that is opposite the first direction.

* * * * *